(12) United States Patent
Robert et al.

(10) Patent No.: US 12,143,567 B2
(45) Date of Patent: Nov. 12, 2024

(54) SUBBLOCK MERGE CANDIDATES IN TRIANGLE MERGE MODE

(71) Applicant: INTERDIGITAL CE PATENT HOLDINGS, SAS, Paris (FR)

(72) Inventors: Antoine Robert, Mézières sur Couesnon (FR); Tangi Poirier, Thorigne-Fouillard (FR); Philippe Bordes, Laillé (FR); Karam Naser, Mouaze (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 103 days.

(21) Appl. No.: 17/785,220

(22) PCT Filed: Dec. 14, 2020

(86) PCT No.: PCT/EP2020/085906
§ 371 (c)(1),
(2) Date: Jun. 14, 2022

(87) PCT Pub. No.: WO2021/122416
PCT Pub. Date: Jun. 24, 2021

(65) Prior Publication Data
US 2023/0023837 A1    Jan. 26, 2023

(30) Foreign Application Priority Data

Dec. 18, 2019 (EP) .................... 19306681.8

(51) Int. Cl.
*H04N 19/105* (2014.01)
*H04N 19/176* (2014.01)
*H04N 19/513* (2014.01)

(52) U.S. Cl.
CPC ......... *H04N 19/105* (2014.11); *H04N 19/176* (2014.11); *H04N 19/513* (2014.11)

(58) Field of Classification Search
None
See application file for complete search history.

(56) References Cited

U.S. PATENT DOCUMENTS

2021/0006803 A1\* 1/2021 Zhang ................... H04N 19/70

OTHER PUBLICATIONS

Chen et al., Algorithm Description for Versatile Video Coding and Test Model 5 (VTM 5), Joint Video Experts Team (JVET) of ITU-T SG 16 WP 3 and ISO/IEC JTC 1/SC 29/WG 11, Document: JVET-N1002-v2, 14th Meeting, Geneva, Switzerland, Mar. 19-27, 2019, 76 pages.

(Continued)

*Primary Examiner* — Xiaolan Xu
(74) *Attorney, Agent, or Firm* — Ronald Kolczynski

(57) ABSTRACT

Sub-block merge motion field is combined with triangle partitioning and geometric partitioning modes to further give coding and decoding schemes flexibility. In at least one embodiment, a flag is used to signal if sub-block merge candidates are used in place of regular merge candidates. In another embodiment, regular merge candidates are replaced by sub-block merge candidates. In another embodiment, at least one motion field is stored. In another embodiment, all sub-block merge candidates or only sub-block temporal motion vector predictors or only affine predictors are considered.

20 Claims, 20 Drawing Sheets

(56) References Cited

OTHER PUBLICATIONS

Bross, et al., Versatile Video Coding (Draft 7), Joint Video Experts Team (JVET) of ITU-T SG 16 WP 3 and ISO/IEC ITC 1/SC 29/WG 11, 16th Meeting: Geneva, CH, Oct. 1-11, 2019, Document: JVET-P2001-VE, pp. 1-489, (2019).

Reuze, et al., CE4-Related: Simplification of GEO Using Angle with Power-of-Two Tangents, Joint Video Experts Team (JVET) of ITU-T SG 16 WP 3 and ISO/IEC JTC 1/SC 29/WG 11, 16th Meeting: Geneva, CH, Oct. 1-11, 2019, Documents: JVET-P0264-V4, pp. 1-6, (2019).

Gao et al., Simplified GEO Without Multiplication and Minimum Blending Mask Storage ( Harmonization of JVET-P0107, JVET0P0264 and JVET-P0304), Joint Video Expert Team (JVET) of ITU-T SG 16 WP 3 and ISO/IEC JTC 1/SC 29/WG 11, 16th Meeting: Geneva, CH, Oct. 1-11, 2019, Document: JVET-P0884-V5, (2019), pp. 1-7.

Zhang et al., An Improved Framework of Affine Motion Compensation in Video Coding, IEEE Transactions on Image Processing, IEEE service center, vol. 28, No. 3, Mar. 1, 2019, pp. 1456-1469.

High Efficiency Video Coding, Series H: Audiovisual and Multimedia Systems Infrastructure of Audiovisual Services—Coding of Moving Video, ITU-T Telecommunication Standardization Sector of Itu, H.265 (Apr. 2015), 634 pages.

Bross, et al., Versatile Video Coding (Draft 7), JVET P2001, Joint Video Experts Team (JVET)of ITU-T SG 16 WP 3 and ISO/IEC JTC 1/SC 29/WG 11, 16th Meeting: Geneva, CH, Oct. 1-11, 2019.

Gao et al., CE4: CE4-1.1, CE4-1.2 and CE4-1.14: Geometric Merge Mode (GEO), Joint Video Experts Team (JVET) of ITU-T SG 16 WP 3 and ISO/IEC JTC 1/SC 29/WG 11, 16 Meeting: Geneva, CH, Oct. 1-11, 2019, Document: JVET-P0068-V2, pp. 1-7, (2019).

Bross et al., Versatile Video Coding (Draft 5), 14. JVET Meeting; Mar. 19, 2019-Mar. 27, 2019; Geneva; (The Joint Video Exploration Team of ISO/IEC JTC1/SC29/WG11 and ITU-T SG.16). No. JVET-N1001, pp. 1-343.

Chen et al., Algorithm Description for Versatile Video Coding and Test Model 7 (VTM 7), Joint Video Experts Team (JVET) of ITU-T SG 16 WP 3 and ISO/IEC JTC 1/SC 29/WG 11, Document: JVET-P2002-V1, 16th Meeting: Geneva, Switzerland, Oct. 1-11, 2019, 90 pages.

Woods, 11.2 Motion Estimation and Motion Compensation; 11.3 Motion-Compensated Filtering, In: Multidimensional Signal, Image, and Video Processing and Coding (2nd Edition), Jan. 1, 2012, pp. 421-447.

* cited by examiner

|   | L0 MV | L1 MV |
|---|---|---|
| Merge Index | | |
| 0 | X | |
| 1 | | x |
| 2 | x | |
| 3 | | x |
| 4 | x | |

Figure 4

SUBBLOCK MERGE CANDIDATES IN TRIANGLE MERGE MODE

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for simplifications of coding modes based on neighboring samples dependent parametric models.

According to a first aspect, there is provided a method. The method comprises steps for obtaining unidirectional triangle candidates from a merge list for encoding a video block; extracting unidirectional portions of said unidirectional triangle candidates; obtaining triangle merge candidates from a sub-block merge list of candidates; extracting unidirectional seeds portion of said triangle merge candidates; performing motion compensation using said unidirectional triangle candidates and said triangle merge candidates; performing weighting on said motion compensated results; signaling whether a sub-block or regular list of candidates was used for said motion compensated results; and encoding the video block using said weighted motion compensated results.

According to a first aspect, there is provided a method. The method comprises steps for parsing a video bitstream to determine whether unidirectional triangle candidates are selected from a sub-block merge list or in a regular merge list; obtaining unidirectional triangle candidates from either a sub-block merge list or a regular merge list for decoding a video block; extracting unidirectional portions of said unidirectional triangle candidates; performing weighting on said motion compensated results; performing motion compensation using said unidirectional triangle candidates; and decoding the video block using said weighted motion compensated results.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 4 shows an example of uniprediction motion vector selection for triangle partition mode.

DETAILED DESCRIPTION

The embodiments described here are in the field of video compression and generally relate to video compression and video encoding and decoding more specifically the quantization step of the video compression scheme. The general aspects described aim to provide a mechanism to operate restrictions in high-level video coding syntax or in the video coding semantics to constrain the possible set of tools combinations.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, motion compensated temporal prediction is employed to exploit the redundancy that exists between successive pictures of a video.

Figure 1:
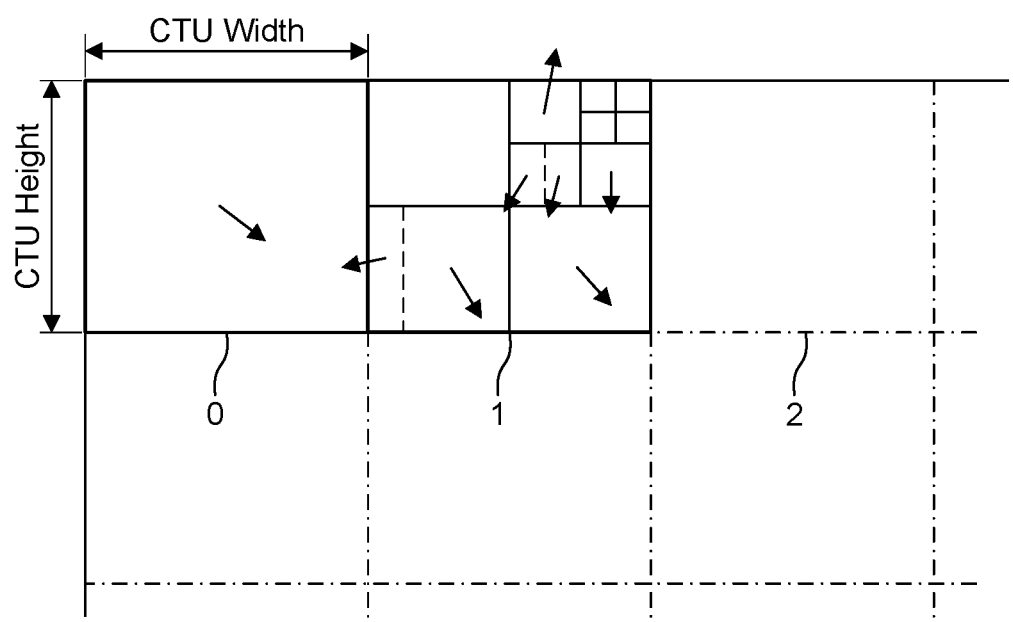
FIG. 1 shows Coding Tree Unit and Coding Tree concepts to represent a compressed HEVC picture.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU), as shown in FIG. 1.

Figure 2:
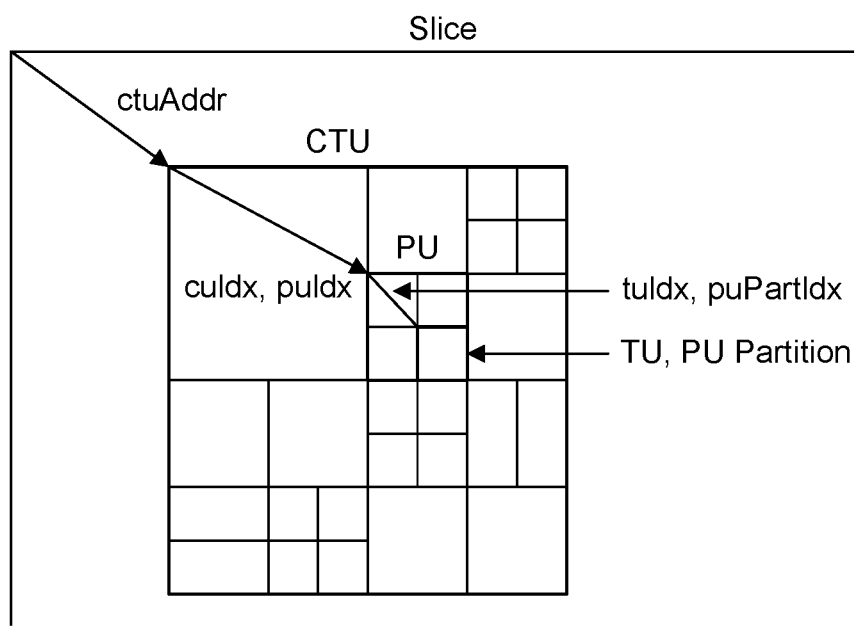
FIG. 2 shows an example division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, as shown in FIG. 2.

Exactly one Motion Vector is assigned to each PU in HEVC. This motion vector is used for motion compensated temporal prediction of the considered PU. Therefore, in HEVC, the motion model that links a predicted block and its reference block simply consists in a translation.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to −135 degree over a 180 angle, and they have been maintained in JEM, which has made the definition of angular directions independent of the target block shape.

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples which is required to cover the aforementioned angle range for all target pixels. Considering that the height and width of a PU are of equal length, the equality of lengths of two reference arrays also makes sense.

The invention is in the field of video compression. It aims at improving the bi-prediction in inter coded blocks compared to existing video compression systems. The present invention also proposes to separate luma and chroma coding trees for inter slices.

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU), see FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

In some video coding standards, a Triangle Partition Mode (TPM) is supported for inter prediction. The triangle partition mode can be derived at CU-level as the remaining merge mode after the other merge modes including the regular merge mode, the MMVD mode, the subblock merge mode and the CIIP mode.

Figure 3:
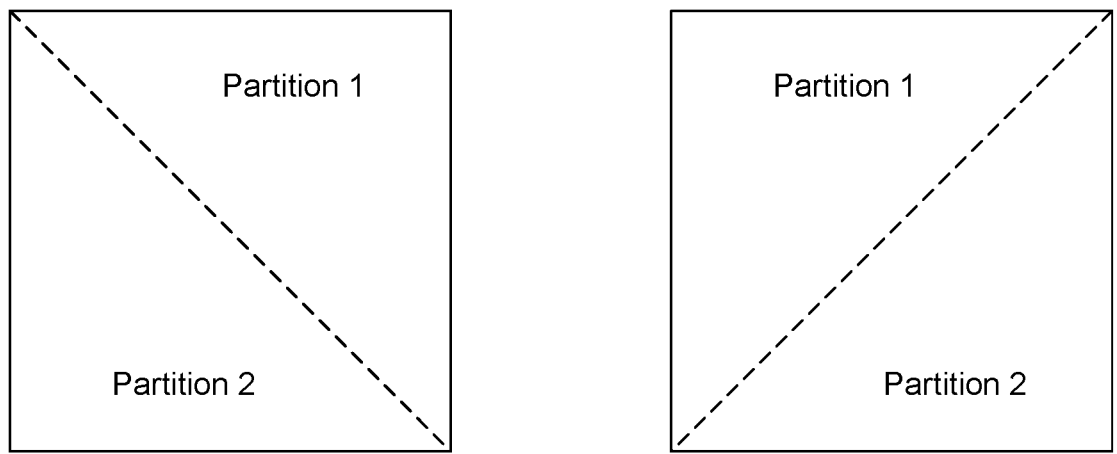
FIG. 3 shows triangle partition based inter prediction.

When this mode is used, a CU is split evenly into two triangle-shaped partitions, using either the diagonal split or the anti-diagonal split, as shown in FIG. 3. Each triangle partition in the CU is inter-predicted using its own motion; only uniprediction is allowed for each partition, that is, each partition has one motion vector and one reference index. The uniprediction motion constraint is applied to ensure that same as the conventional bi-prediction, only two motion compensated predictions are needed for each CU. The uniprediction motion for each partition is derived using the process described below.

If triangle partition mode is used for a current CU, then a flag indicating the direction of the triangle partition (diagonal or anti-diagonal), and two merge indices (one for each partition) are further signaled as described below. The number of maximum TPM candidates is signaled explicitly at slice level and specifies syntax binarization for TMP merge indices. After predicting each of the triangle partitions, the sample values along the diagonal or anti-diagonal edge are adjusted using a blending process with adaptive weights. This is the prediction signal for the whole CU, then transform and quantization process will be applied to the whole CU as in other prediction modes. Finally, the motion field of a CU predicted using the triangle partition mode is stored in 4×4 units as described below.

Figure 4:
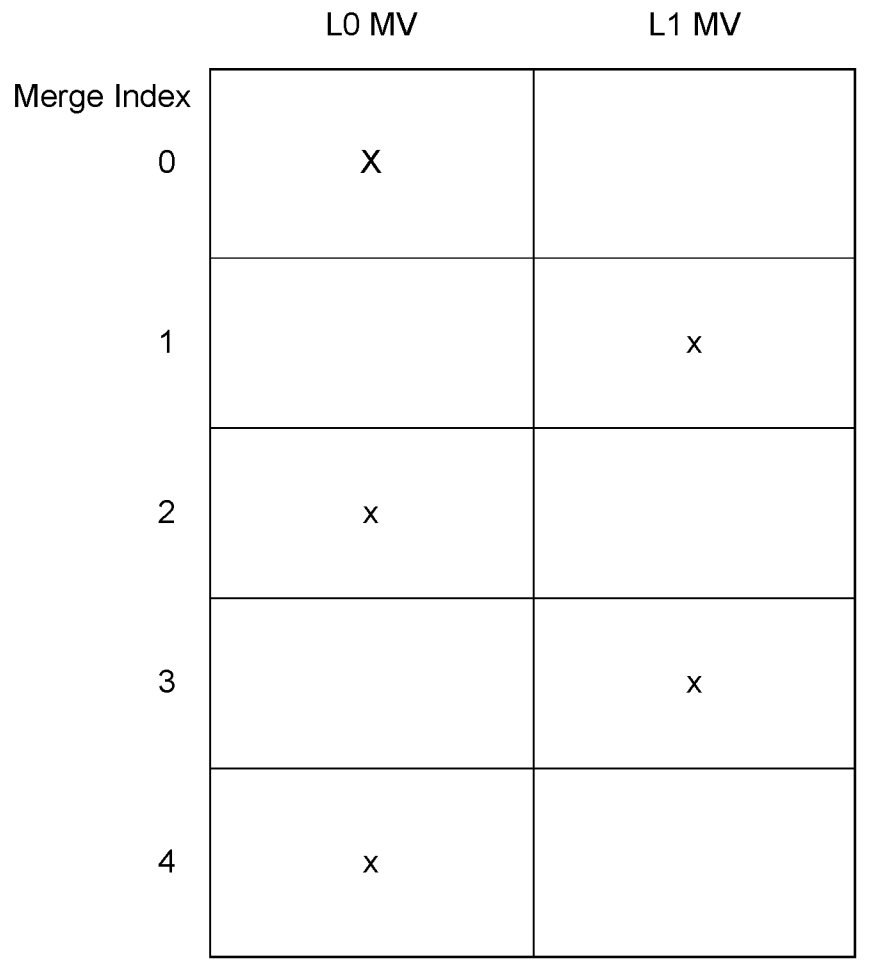

The uniprediction candidate list is derived directly from the merge candidate list constructed according to the extended merge prediction process. Denote n as the index of the uniprediction motion in the triangle uniprediction candidate list. The LX motion vector of the n-th extended merge candidate, with X equal to the parity of n, is used as the n-th uniprediction motion vector for triangle partition mode. These motion vectors are marked with "x" in FIG. 4. In case a corresponding LX motion vector of the n-th extended merge candidate does not exist, the L(1−X) motion vector of the same candidate is used instead as the uniprediction motion vector for triangle partition mode There are up to 5 uniprediction candidates and an encoder has to test all the combinations of candidates (one for each partition) in the 2 splitting directions. Therefore, the maximum number of tested combinations is 40 (5*4*2) with the actual Common Test Conditions (CTC) (where MaxNumTriangleMergeCand=5 and nb_combinations=MaxNumTriangleMergeCand* (MaxNumTriangleMergeCand−1)*2). As described above, the triangle partition mode needs to signal (i) a binary flag indicating the direction of the triangle partition, and (ii) two merge indices after deriving if the mode is used.

In the following are presented parts of a typical video compression standard (VVC specification draft 7.0) where the triangle partition signaling is involved (italicized).

7.3.9.7 Merze Data Syntax

|  | Descriptor |
|---|---|
| merge data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && | |
|         cu_skip_flag[ x0 ][ y0] = = 0 && cbWidth < 128 && cbHeight < 128 ) \| \| | |
|         ( sps_triangle_enabled_flag && MaxNumTriangleMergeCand > 1 && | |
|         slice_type == B) ) ) | |
|         regular_merge_flag[ x0 ][ y0 ] | ae(v) |
|       if( regular_merge_flag[ x0 ][ y0 ] = = 1 ) { | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else if( MaxNumMergeCand > 1 ) | |
|           merge_idx[ x0 ][ y0 ] | ae(v) |
|       } else { | |
|         if( sps_ciip_enabled_flag && sps_triangle_enabled_flag && | |
|           MaxNumTriangleMergeCand > 1 && slice_type = = B && | |
|           cu_skip_flag[ x0 ][ y0 ] = = 0 && | |
|           ( cbWidth * cbHeight ) >= 64 && cbWidth < 128 && cbHeight < 128 ) | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           if( MaxNumTriangleMergeCand > 2 ) | |
|             merge_triangle_idx1[ x0 ][ y0 ] | ae(v) |
|         } | |
|       } | |
|     } | |
|   } | |
| } | |

As described above, the motion field of a triangle predicted CU is stored on 4×4 sub-block basis. Each triangular partition stores the unidirectional motion filed of the corresponding candidate. On the split direction, if the candidates address different reference picture lists, then the 4×4 sub-blocks of the diagonal store a bi-directional motion field as the combination of the two unidirectional ones. Otherwise, when both candidates address the same reference picture list, the 4×4 sub-blocks of the diagonal store the unidirectional motion field of the bottom candidate.

Figure 5:
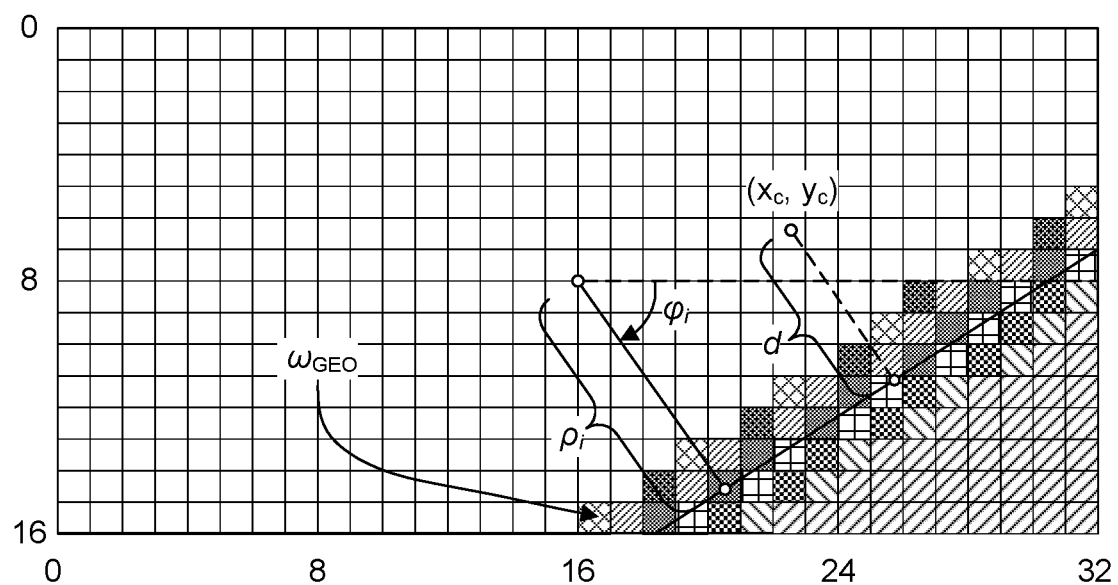
FIG. 5 shows geometric split decision.
Figure 6:
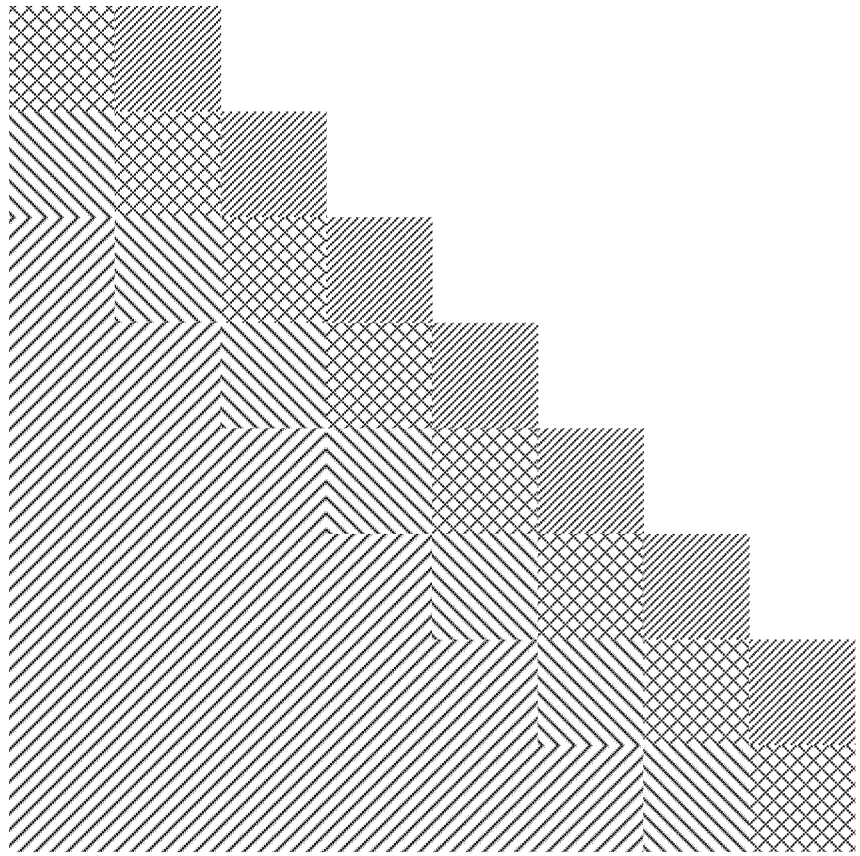
FIG. 6 shows an example geometric partition with angle 12 and distance 0.
Figure 7:
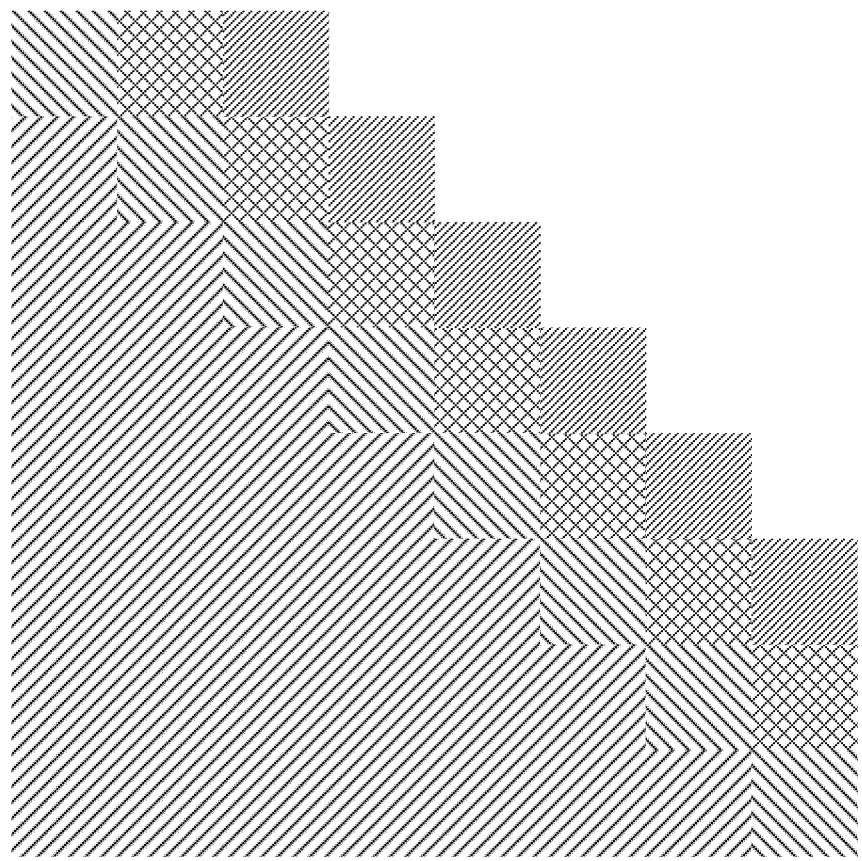
FIG. 7 shows an example geometric partition with angle 12 and distance 1.
Figure 8:
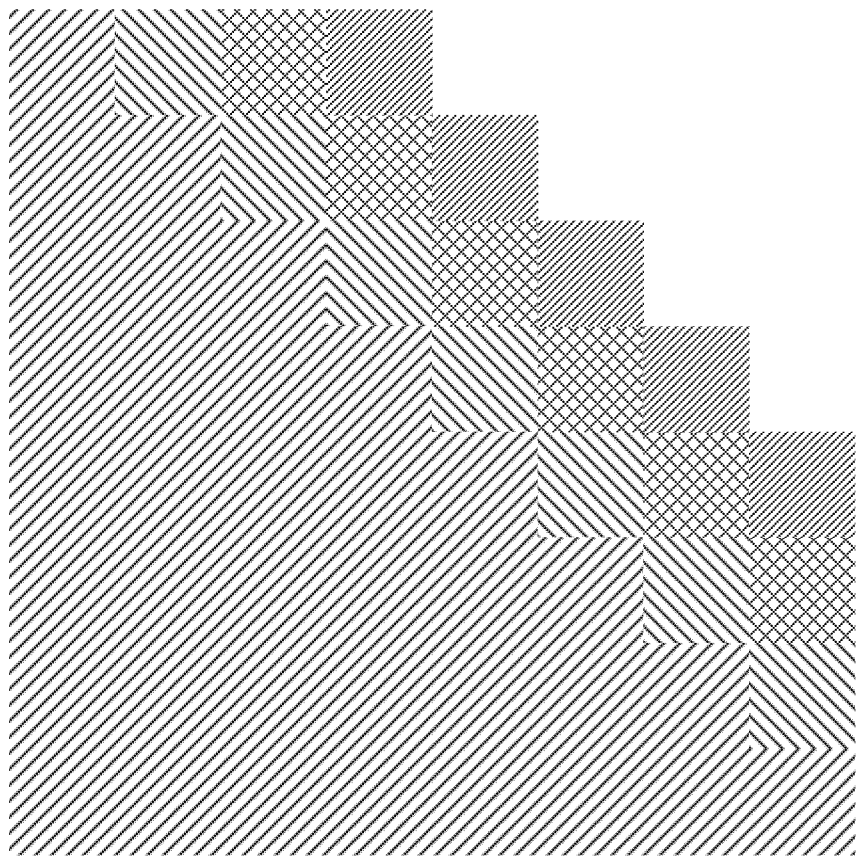
FIG. 8 shows an example geometric partition with angle 12 and distance 2.
Figure 9:
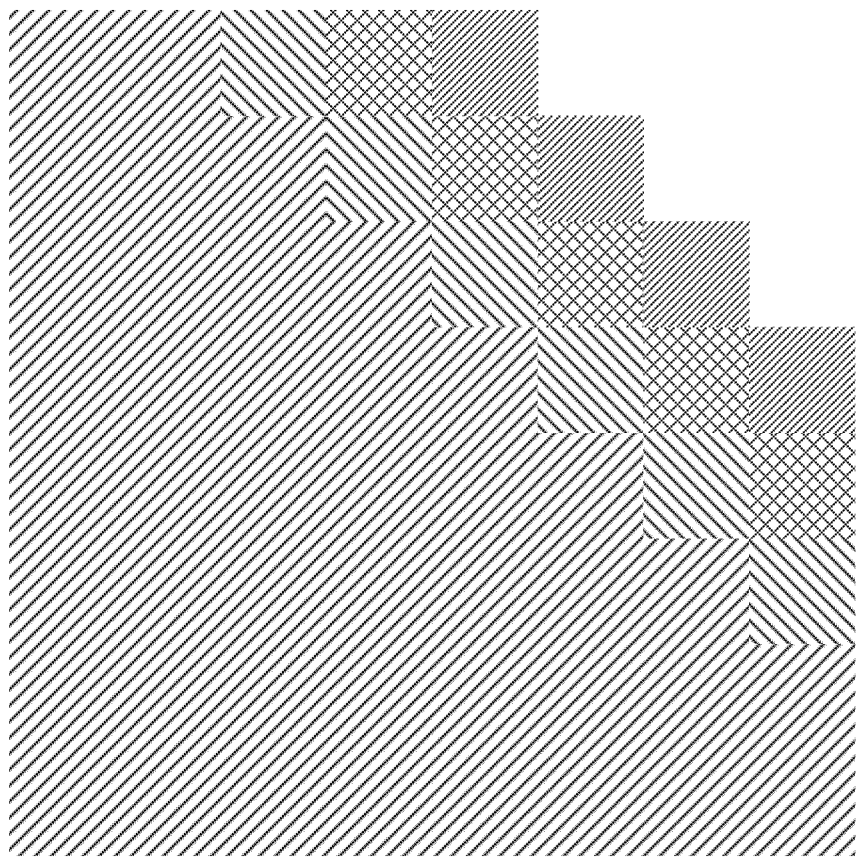
FIG. 9 shows an example geometric partition with angle 12 and distance 3.
Figure 10:
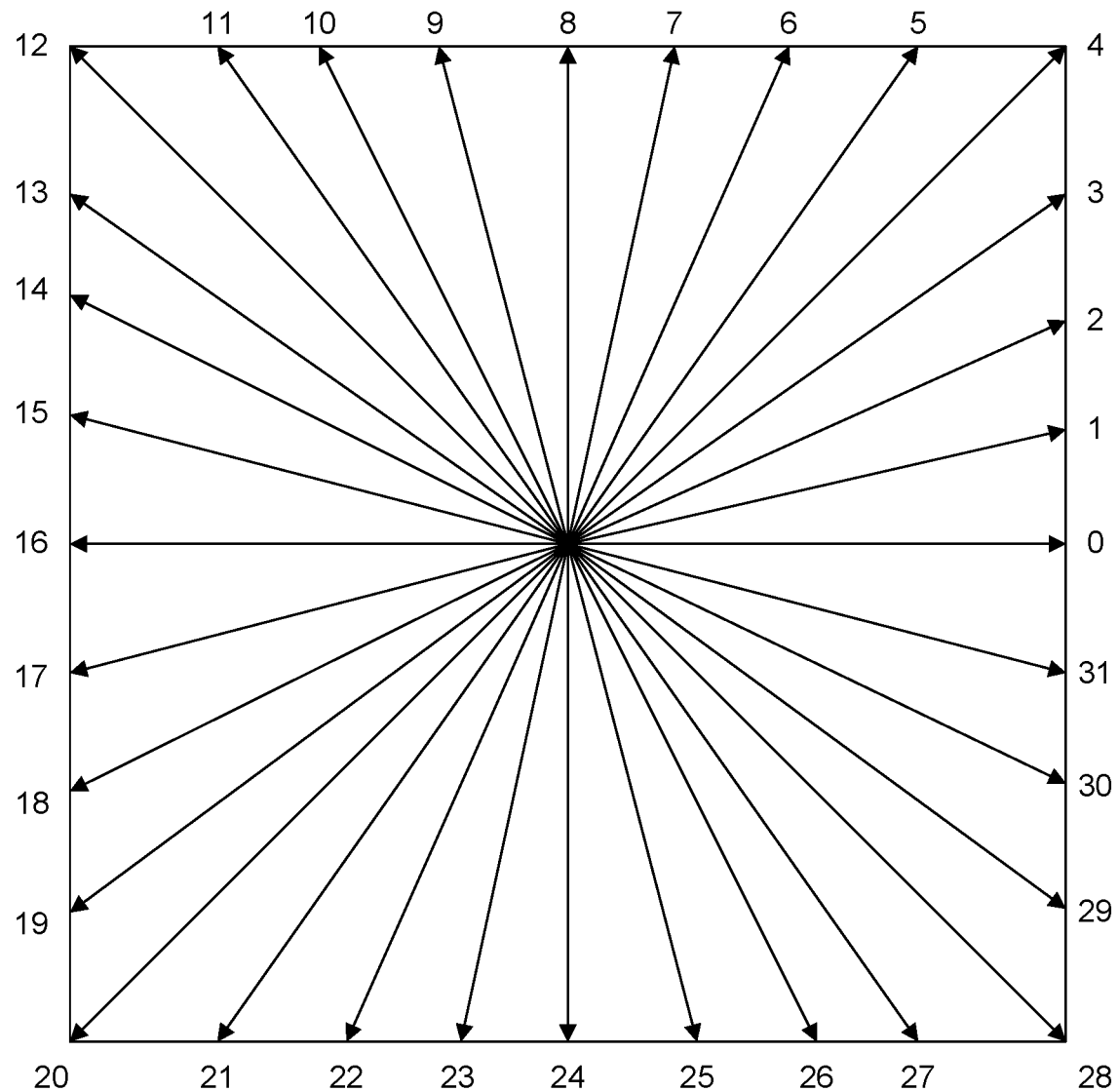
FIG. 10 shows the 32 angles in Geometric mode.

A geometric merge mode has been proposed with 32 angles and 5 distances. The angle $\varphi_i$ is quantized from between 0 and 360 degrees with a step equal to 11.25 degree. In total 32 angles are proposed as shown in FIG. 10. The description of a geometric split with angle $\varphi_i$ and distance $\rho_i$ is depicted in FIG. 5.

Distance $\rho_i$ is quantized from the largest possible distance $\rho_{max}$ with a fixed step, it indicates a distance from the center of the block. For distance $\rho_i=0$, only the first half of the angles are available as splits are symmetric in this case. The results of geometric partitioning using angle 12 and distance between 0 to 3 is depicted in FIG. 6 to FIG. 9.

For a distance $\rho_i$ equal to 0, symmetrical angles 16 to 31 are removed because they correspond to same splits as 0-15, diagonal angles 4 and 12 are excluded because they are equivalent to the two TPM partition modes. Angles 0 and 8 are also excluded because they are similar to binary split of CUs, leaving only 12 angles for distance 0. So, a maximum of 140 split modes may be used by geometric partitioning (12+32*4=140 or 14+32*4=142, if you remove Triangle partition mode and add corresponding angles in Geometric partition mode).

Figure 11:
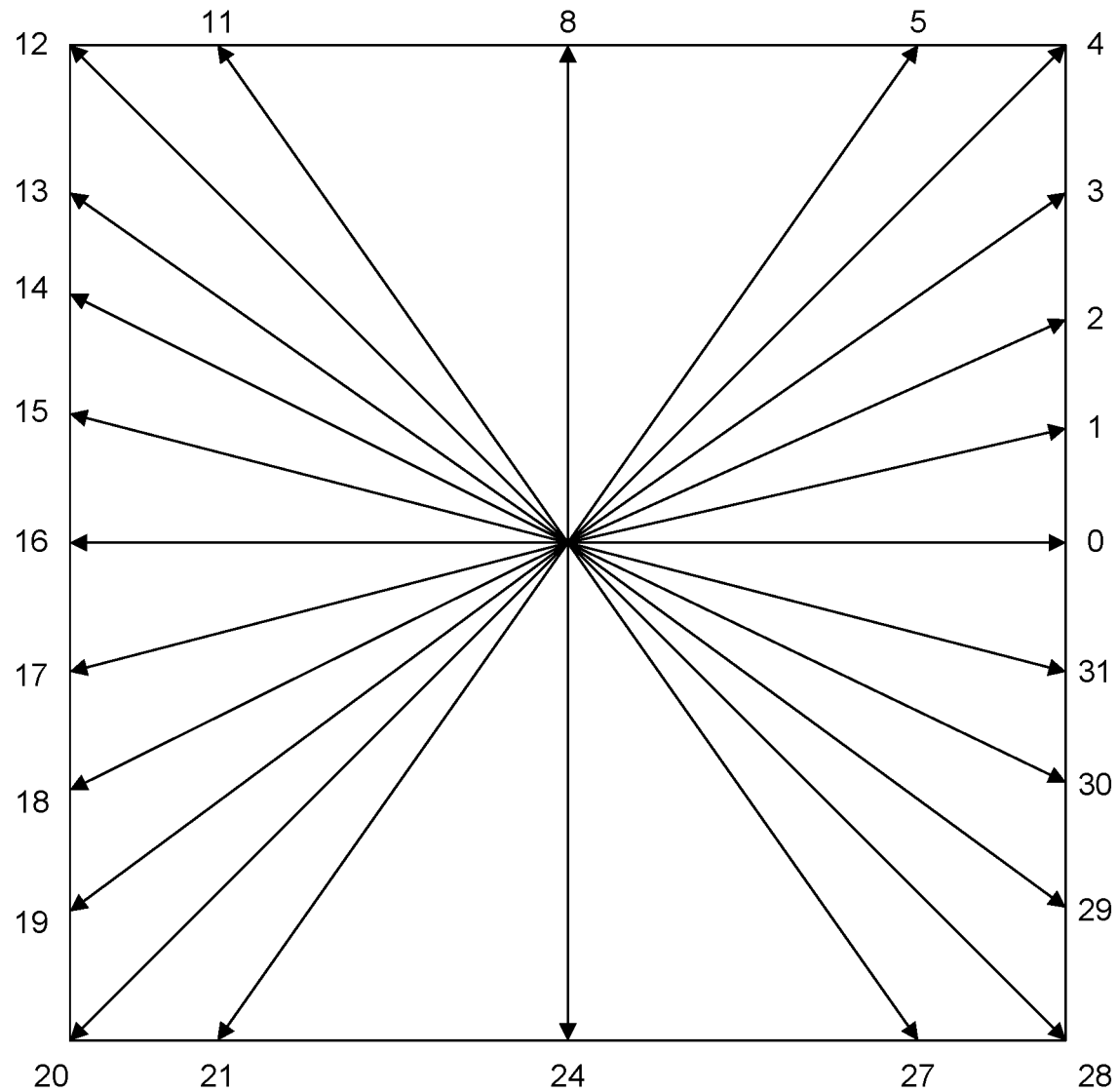
FIG. 11 shows the 24 angles for Geometric partitioning.

A 24 angles scheme with only 4 distances has also been proposed by removing angles near the vertical values, as shown in FIG. 11. In this case a maximum of 82 modes are used by geometric partitioning (10+24*3=82).

In the following, we will consider that Triangle Partition Mode is integrated in Geometric merge mode by enabling angles 4 and 12 for distance equal to 0.

An example of syntax proposed for geometric partition is depicted in Table 1. The truncated binary (TB) binarization process is used to encode wedge_partition_idx (Table 1), the mapping between wedge_partition_idx and angle and distance is shown in Table 2.

TABLE 1

| Merge data syntax for Geometric partitioning in an example scheme | |
|---|---|
| | Descriptor |
| merge data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && | |
|       cu_skip_flag[ x0 ][ y0] = = 0 && cbWidth < 128 && cbHeight < 128 ) \|\| | |
|       ( sps_triangle_enabled_flag && MaxNumTriangleMergeCand > 1 && | |
|       slice_type == B) ) ) | |
|         regular_merge_flag[ x0 ][ y0 ] | ae(v) |
|       if( regular_merge_flag[ x0 ][ y0 ] = = 1 ) { | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else if( MaxNumMergeCand > 1 ) | |
|           merge_idx[ x0 ][ y0 ] | ae(v) |
|       } else { | |
|         if( sps_ciip_enabled_flag && sps_triangle_enabled_flag && | |
|         MaxNumTriangleMergeCand > 1 && slice_type = = B && | |
|         cu_skip_flag[ x0 ][ y0 ] = = 0 && | |
|         ( cbWidth * cbHeight ) >= 64 && cbWidth < 128 && cbHeight < 128 ) | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           wedge_partition_idx[ x0 ][ y0 ] | ae(v) |
|           merge_wedge_idx0[ x0 ][ y0 ] | ae(v) |
|           merge_wedge_idx1[ x0 ][ y0 ] | ae(v) |
|         } | |
|       } | |
|     } | |
|   } | |
| } | | wedge_partition_idx [x0][y0] specifies the geometric splitting type of the merge geometric mode. The array indices x0, y0 specify the location (x0, y0) of the top-left luma sample of the considered coding block relative to the top-left luma sample of the picture.

TABLE 1

Specification of the angleIdx and distanceIdx values based on the wedge_partition_idx value

| wedge_partition_idx | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| angleIdx | 0 | 0 | 0 | 1 | 1 | 1 | 1 | 2 | 2 | 2 | 2 | 4 | 4 | 4 | 4 | 6 | 6 |
| distanceIdx | 1 | 2 | 3 | 0 | 1 | 2 | 3 | 0 | 1 | 2 | 3 | 0 | 1 | 2 | 3 | 0 | 1 |
| | 17 | 18 | 19 | 20 | 21 | 22 | 23 | 24 | 25 | 26 | 27 | 28 | 29 | 30 | 31 | 32 | 33 |
| angleIdx | 6 | 6 | 7 | 7 | 7 | 7 | 8 | 8 | 8 | 9 | 9 | 9 | 9 | 10 | 10 | 10 | 10 |
| distanceIdx | 2 | 3 | 0 | 1 | 2 | 3 | 1 | 2 | 3 | 0 | 1 | 2 | 3 | 0 | 1 | 2 | 3 |
| | 34 | 35 | 36 | 37 | 38 | 39 | 40 | 41 | 42 | 43 | 44 | 45 | 46 | 47 | 48 | 49 | |
| angleIdx | 12 | 12 | 12 | 12 | 14 | 14 | 14 | 14 | 15 | 15 | 15 | 15 | 16 | 16 | 16 | 17 | |
| distanceIdx | 0 | 1 | 2 | 3 | 90 | 1 | 2 | 3 | 0 | 1 | 2 | 3 | 1 | 2 | 3 | 1 | |
| | 50 | 51 | 52 | 53 | 54 | 55 | 56 | 57 | 58 | 59 | 60 | 61 | 62 | 63 | 64 | 65 | |
| angleIdx | 17 | 17 | 18 | 18 | 18 | 20 | 20 | 20 | 22 | 22 | 22 | 23 | 23 | 23 | 24 | 24 | |
| distanceIdx | 2 | 3 | 1 | 2 | 3 | 1 | 2 | 3 | 1 | 2 | 3 | 1 | 2 | 3 | 1 | 2 | |
| | 66 | 67 | 68 | 69 | 70 | 71 | 72 | 73 | 74 | 75 | 76 | 77 | 78 | 79 | 80 | 81 | |
| angleIdx | 24 | 25 | 25 | 25 | 26 | 26 | 26 | 28 | 28 | 28 | 30 | 30 | 30 | 31 | 31 | 31 | |
| distanceIdx | 3 | 1 | 2 | 3 | 1 | 2 | 3 | 1 | 2 | 3 | 1 | 2 | 3 | 1 | 2 | 3 | |

TABLE 2

Syntax elements and associated binarizations

```
merge_data( ) regular_merge_flag[ ][ ]    FL   cMax = 1
              mmvd_merge_flag[ ][ ]       FL   cMax = 1
              mmvd_cand_flag[ ][ ]        FL   cMax = 1
              mmvd_distance_idx[ ][ ]     TR   cMax = 7, cRiceParam = 0
              mmvd_direction_idx[ ][ ]    FL   cMax = 3
              ciip_flag[ ][ ]             FL   cMax = 1
              merge_subblock_flag[ ][ ]   FL   cMax = 1
              merge_subblock_idx[ ][ ]    TR   cMax = MaxNumSubblockMergeCand − 1, cRiceParam = 0
              wedge_partition_idx[ ][ ]   TB   cMax = 82
              merge_wedge_idx0[ ][ ]      TR   cMax = MaxNumWedgeMergeCand − 1, cRiceParam = 0
              merge_wedge_idx1[ ][ ]      TR   cMax = MaxNumWedgeMergeCand − 2, cRiceParam = 0
              merge_idx[ ][ ]             TR   cMax = MaxNumMergeCand − 1, cRiceParam = 0
```

Figure 12:
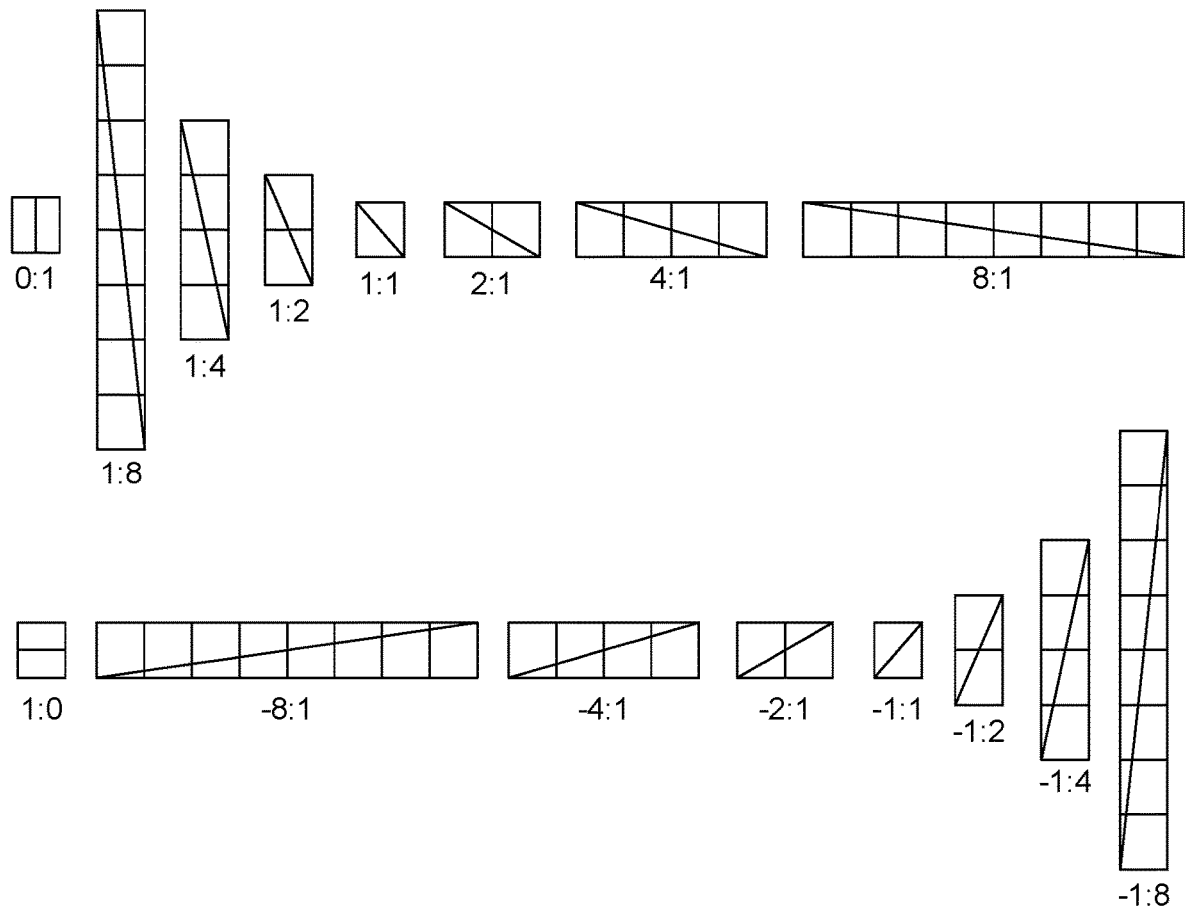
FIG. 12 shows the angles proposed in one approach for GEO with their corresponding width:height ratio.

The angles in GEO are replaced with the angles which have powers of 2 as tangent. Since the tangent of the proposed angles is a power-of-2 number, most of multiplications can be replaced by bit-shifting. With the proposed angles, one row or column is needed to store per block size and per partition mode, as depicted in FIG. 12.

One problem solved by this invention is to allow using sub-block merge motion field in Triangle and GEO coding modes. In at least one proposed scheme, when the triangle partition mode is used the considered unidirectional candidates can only be derived from the regular merge list.

At least one embodiment proposes to consider sub-block merge candidates in the triangle and GEO partition modes.

The following general aspects are covered by the invention:

Add one flag to signal if sub-block merge candidates are used instead of regular merge ones.

Replace some regular merge candidates by sub-block merge ones.

Storage of the motion field.

Consider all sub-block merge candidates or only SbTMVP or only Affine ones.

This invention concerns the Motion Compensation circuitry, at least, in an encoder or a decoder. The following embodiments comprise some of the general aspects herein.

As GEO is an extension of the triangle partition mode (or triangle is a particular case of GEO), in the following, all the description is based on the triangle partition mode but can be also applied to GEO mode.

The two unidirectional candidates of a triangular CU, one for each triangle partition, are denoted $Cand_0$ and $Cand_1$ respectively.

Each of these unidirectional candidates, $Cand_x$, corresponds to a merge_triangle_$idx_x$, denoted $idx_x$, and is associated with a motion vector $mv_x$ and its reference frame of index $refidx_x$ over reference picture list $L_y$ (where y is given by the parity of the index $idx_x$).

In a first embodiment, it is proposed to add a new triangle mode dedicated to sub-block candidates.

All the processes of the actual triangle partition mode are duplicated to test also the candidates derived from the sub-block merge mode list.

For that, an encoder performs two times the triangle partition mode RDO. The first pass is the VTM-7.0 where unidirectional triangle candidates are picked in the regular merge list. In the second pass, the candidates are picked in the sub-block merge candidate list and all the remaining triangle processes remain unchanged.

A new CU attribute has to be added in order to carry the type of list used (sub-block or regular). It has also to be signaled and is denoted subblock_merge_triangle.

At the decoder side, if the subblock_merge_triangle flag is 1, then the unidirectional triangle candidates are picked in the sub-block merge list otherwise they are picked in the regular merge list.

In a current standard, where the triangle partition signaling is involved (italicized) becomes for the presented example (italicized):
7.3.9.7 Merge data syntax triangle candidates by sub-block ones. Furthermore, in that case, it becomes possible to combine one sub-block partition with one regular one.

In a variant, the first candidates of the unidirectional triangle list are picked in the regular merge list and the last ones in the sub-block merge list. As an example, the three first ones are the same as in VTM-7.0 coming from the regular merge list, and the two last ones are the two first unidirectional candidates picked in the sub-block merge list.

In another variant, even candidate indexes refer to candidates picked in the regular merge list and odd ones to candidates picked in the sub-block merge list.

In another variant, the number of unidirectional triangle candidates can be increased compared to VTM-7.0. In

|  | Descriptor |
|---|---|
| merge_data( x0, y0, cbWidth, cbHeight, chType ) { |  |
|   if( CuPredMode[ chType ][ x0 ][ y0 ] = = MODE_IBC ) { |  |
|     if( MaxNumIbcMergeCand > 1 ) |  |
|       merge_idx[ x0 ][ y0 ] | ae(v) |
|   } else { |  |
| ... |  |
|     } else { |  |
|       if( sps_ciip_enabled_flag && sps_triangle_enabled_flag && |  |
|         MaxNumTriangleMergeCand > 1 && slice_type = = B && |  |
|         cu_skip_flag[ x0 ][ y0 ] = = 0 && |  |
|         ( cbWidth * cbHeight ) >= 64 && cbWidth < 128 && cbHeight < 128 ) |  |
|         ciip_flag[ x0 ][ y0 ] | ac(v) |
|       if( ciip_flag[ x0 ][ y0 ] && MaxNumMergeCand > 1 ) |  |
|         merge_idx[ x0 ][ y0 ] | ae(v) |
|       if( !ciip_flag[ x0 ][ y0 ] && MaxNumTriangleMergeCand > 1 ) { |  |
|         subblock_merge_triangle[ x0 ][ y0 ] | ae(v) |
|         merge_triangle_split_dir[ x0 ][ y0 ] | ae(v) |
|         merge_triangle_idx0[ x0 ][ y0 ] | ae(v) |
|         if( MaxNumTriangleMergeCand > 2 ) |  |
|           merge triangle_idx1[ x0 ][ y0 ] | ae(v) |
|       } |  |
|     } |  |
|   } |  |
| } |  | subblock_merge_triangle[x0][y0] specifies if sub-block mode list and motion compensation have to be used instead of regular ones. The array indices x0, y0 specify the location (x0, y0) of the top-left luma sample of the considered coding block relative to the top-left luma sample of the picture. When subblock_merge_triangle [x0] [y0] is not present, it is inferred to be equal to 0.

VTM-7.0, this number is set to 5. For example, it can be doubled to hold all the VTM-7.0 candidates picked in the regular merge list and also all those coming from the sub-block merge list.

Motion Field Storage:

As described above, the motion field of a triangle predicted CU is still stored on 4×4 sub-block basis.

| merge_data( ) | regular_merge_flag[ ][ ] | FL | cMax = 1 |
|---|---|---|---|
|  | mmvd_merge_flag[ ][ ] | FL | cMax = 1 |
|  | mmvd_cand_flag[ ][ ] | FL | cMax = 1 |
|  | mmvd_distance_idx[ ][ ] | TR | cMax = 7, cRiceParam = 0 |
|  | mmvd_direction_idx[ ][ ] | FL | cMax = 3 |
|  | ciip_flag[ ][ ] | FL | cMax = 1 |
|  | merge_subblock_flag[ ][ ] | FL | cMax = 1 |
|  | merge_subblock_idx[ ][ ] | TR | cMax = MaxNumSubblockMergeCand − 1, cRiceParam = 0 |
|  | subblock_merge_triangle[ ][ ] | FL | cMax = 1 |
|  | merge_triangle_split_dir[ ][ ] | FL | cMax = 1 |
|  | merge_triangle_idx0[ ][ ] | TR | cMax = MaxNumTriangleMergeCand − 1, cRiceParam = 0 |
|  | merge_triangle_idx1[ ][ ] | TR | cMax = MaxNumTriangleMergeCand − 2, cRiceParam = 0 |
|  | merge_idx[ ][ ] | TR | cMax = ( CuPredMode[ 0 ][ x0 ][ y0 ] != MODE_IBC ? MaxNumMergeCand : MaxNumIbcMergeCand ) − 1, cRiceParam = 0 |

In a second embodiment, in order to limit the encoder complexity impact and to avoid modifying the syntax, it is possible to replace some of the existing unidirectional Each triangular partition stores the unidirectional motion filed of the corresponding candidate even if it comes from regular or sub-block merge list.

On the split direction, if the candidates address different reference picture lists, then the 4×4 sub-blocks of the diagonal store a bi-directional motion field as the combination of two unidirectional ones. Otherwise, when both candidates address the same reference picture list, the 4×4 sub-blocks of the diagonal store the unidirectional motion field of the bottom candidate.

In a variant, when both candidates address the same reference picture list, the 4×4 sub-blocks of the diagonal can store the unidirectional motion field of the bottom candidate when both candidates are from the same merge list, and the regular unidirectional motion field when candidates are from different merge lists.

In another variant, it is also possible to store affine CPMVs (seeds) associated with a triangular partition when the candidate is from sub-block merge list and is affine. These CPMVs can then be used for inheritance.

The sub-block merge list consists, in the VTM-7.0, in 5 candidates of different nature. It can be a SbTMVP candidate, an inherited or a constructed affine model.

In both previous embodiments, one can choose to select unidirectional triangle candidates in the full sub-block merge list or to use only the SbTMVP candidate, all the affine candidates, the inherited affine candidates or the constructed affine candidates only.

It is possible in the previous embodiments to restrict the usage of the sub-block merge candidates. In that case, the sub-block merge list is not considered in the unidirectional triangle candidate list when the constraint is not fulfilled.

The usage of the sub-block merge list in Triangle partition mode can be restricted according to the dimensions of the current CU.

It can be restricted according to its size, i.e. to its width and height. For example, sub-block list usage is only allowed for CU which width and height are larger or equal to 8 (w>=8 && h>=8) (or (w>=16 && h>=16) (w+h>12) . . . )

It can also be restricted according to its area. For example, sub-block list usage is only allowed for CU which area is larger than 32 (w*h>32) (or (w*h>=64) (w*h<256) . . . )

In case only affine candidates are considered during unidirectional triangle list construction (all affine or only inherited affine candidates), the sub-block merge list usage can be restricted to CU which has at least an affine neighboring CU, i.e. only when sub-block merge list contains inherited affine models.

Figure 18:
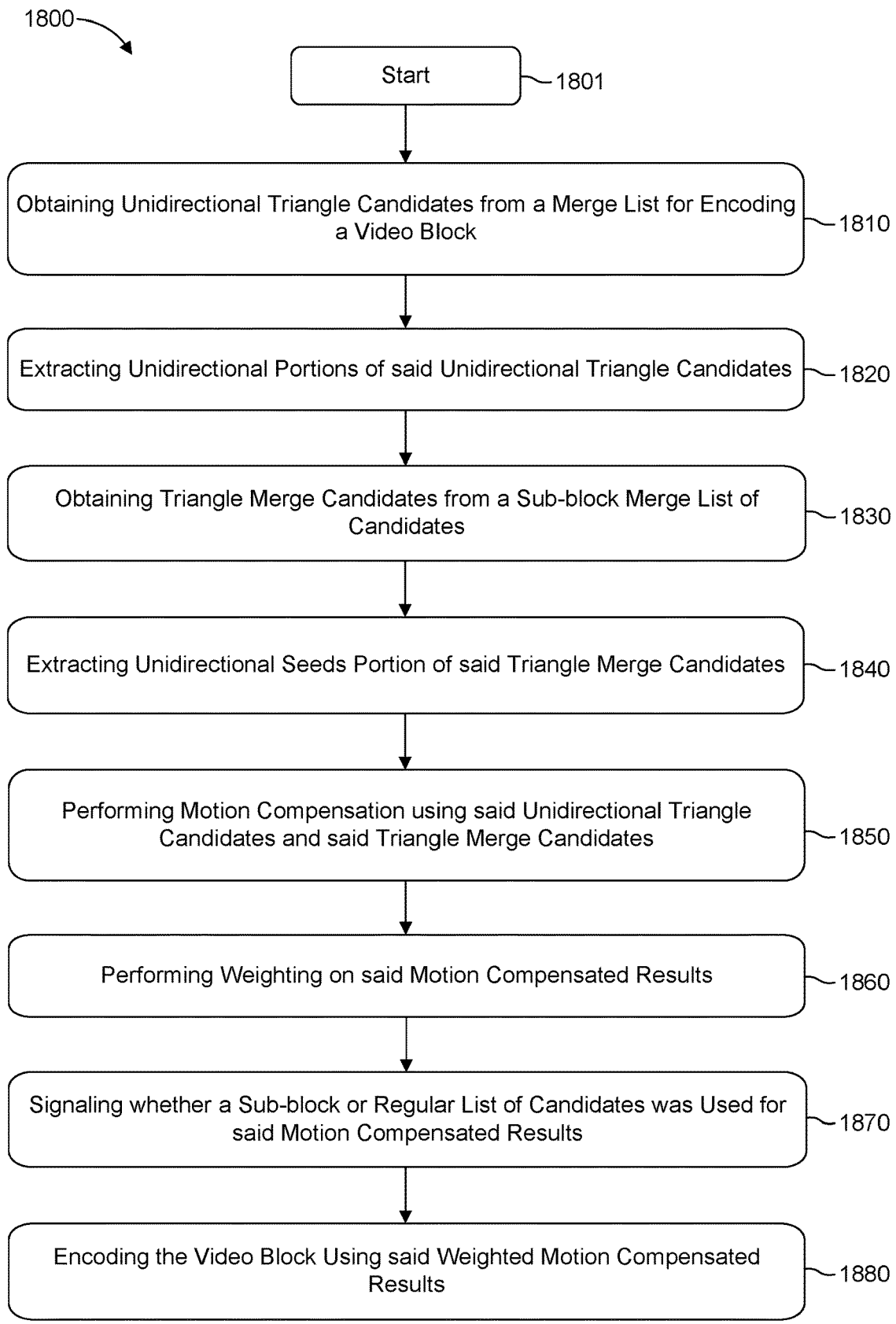
FIG. 18 shows one embodiment of a method under the general described aspects.

One embodiment of a method 1800 under the general aspects described here is shown in FIG. 18. The method commences at start block 1801 and control proceeds to block 1810 for obtaining unidirectional triangle candidates from a merge list for encoding a video block. Control proceeds from block 1810 to block 1820 for extracting unidirectional portions of the unidirectional triangle candidates. Control proceeds from block 1820 to block 1830 for obtaining triangle merge candidates from a sub-block merge list of candidates. Control proceeds from block 1830 to block 1840 for extracting unidirectional seeds portion of the triangle merge candidates. Control proceeds from block 1840 to block 1850 for performing motion compensation using the unidirectional triangle candidates and the triangle merge candidates. Control proceeds from block 1850 to block 1860 for performing weighting on the motion compensated results. Control proceeds from block 1860 to block 1870 for signaling whether a sub-block list or a regular list of candidates was used for the motion compensated results. Control proceeds from block 1870 to block 1880 for encoding the video block using the weighted motion compensated results.

Figure 19:
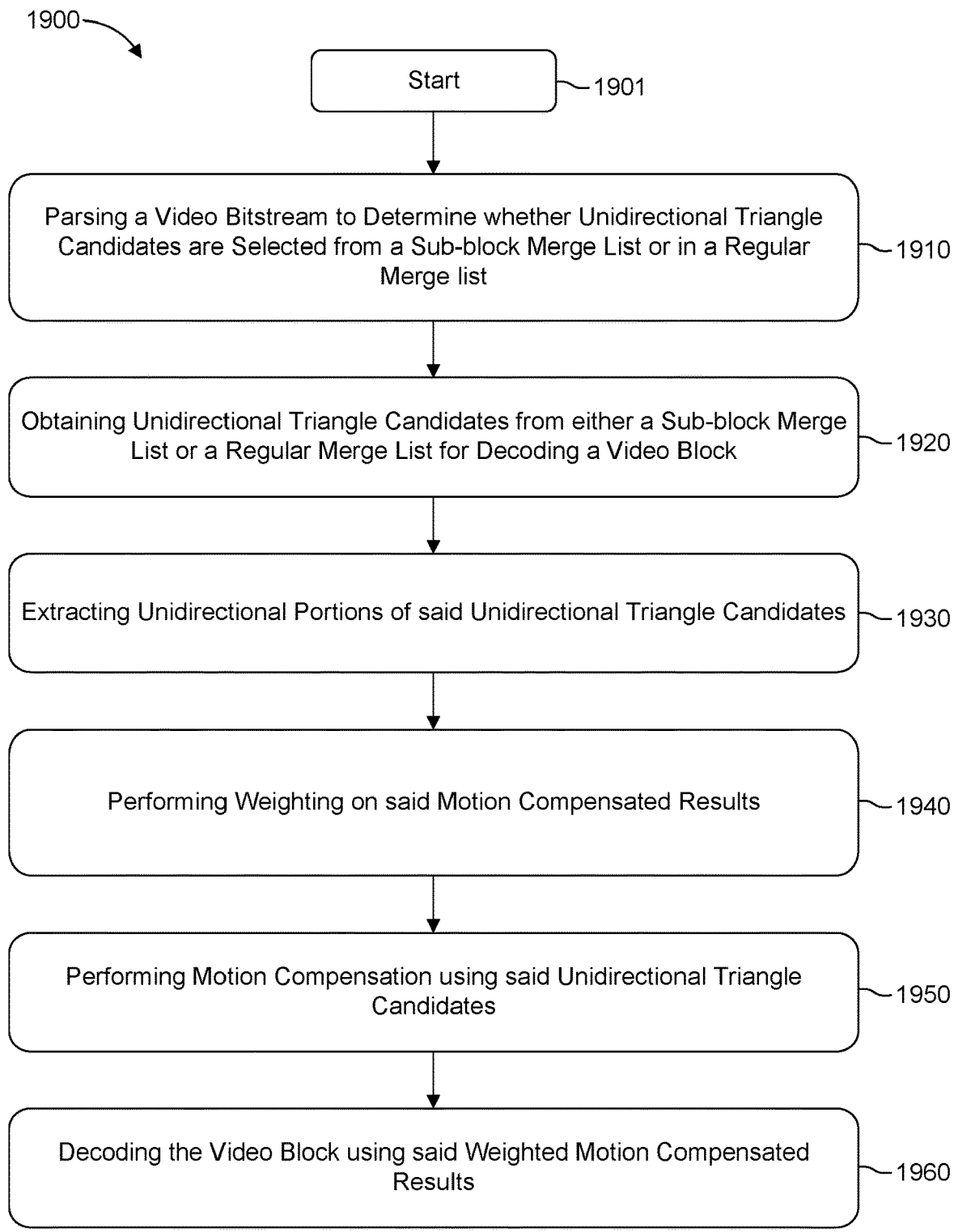
FIG. 19 shows another embodiment of a method under the general described aspects.

One embodiment of a method 1900 under the general aspects described here is shown in FIG. 19. The method commences at start block 1901 and control proceeds to block 1910 for parsing a video bitstream to determine whether unidirectional triangle candidates are selected from a sub-block merge list or from a regular merge list. Control proceeds from block 1910 to block 1920 for obtaining unidirectional triangle candidates from either a sub-block merge list or a regular merge list for decoding a video block. Control proceeds from block 1920 to block 1930 for extracting unidirectional portions of the unidirectional triangle candidates. Control proceeds from block 1930 to block 1940 for performing weighting on the motion compensated results. Control proceeds from block 1940 to block 1950 for performing motion compensation using the unidirectional triangle candidates. Control proceeds from block 1950 to block 1960 for decoding the video block using the weighted motion compensated results.

Figure 20:
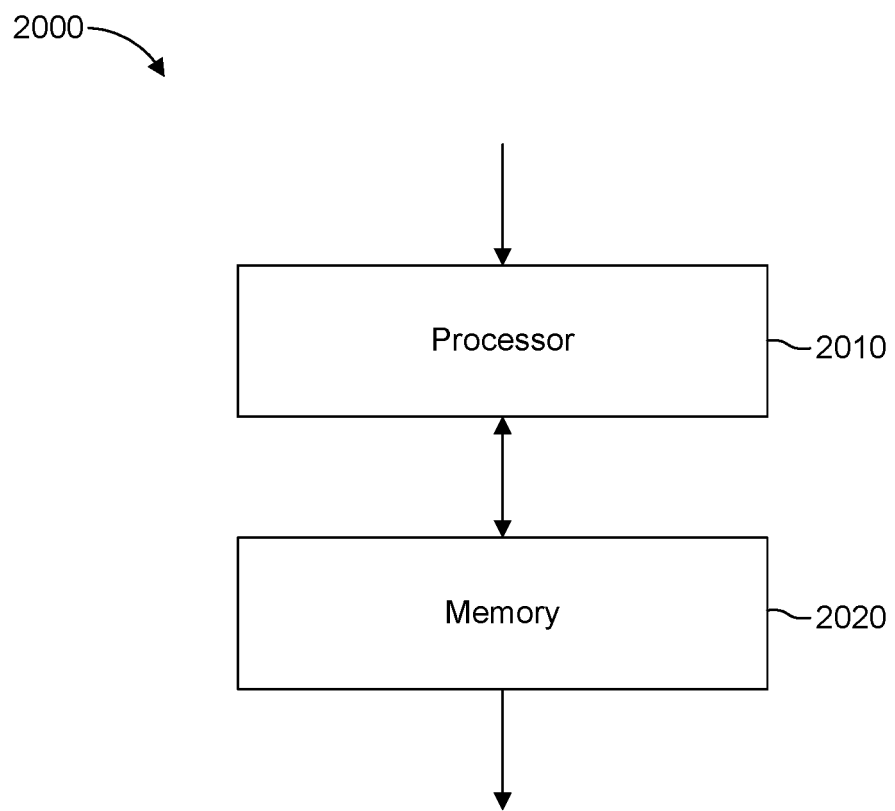
FIG. 20 shows an example apparatus under the described aspects.

FIG. 20 shows one embodiment of an apparatus 2000 for encoding, decoding, compressing or decompressing video data using simplifications of coding modes based on neighboring samples dependent parametric models. The apparatus comprises Processor 2010 and can be interconnected to a memory 2020 through at least one port. Both Processor 2010 and memory 2020 can also have one or more additional interconnections to external connections.

Processor 2010 is also configured to either insert or receive information in a bitstream and, either compressing, encoding or decoding using any of the described aspects.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 13:
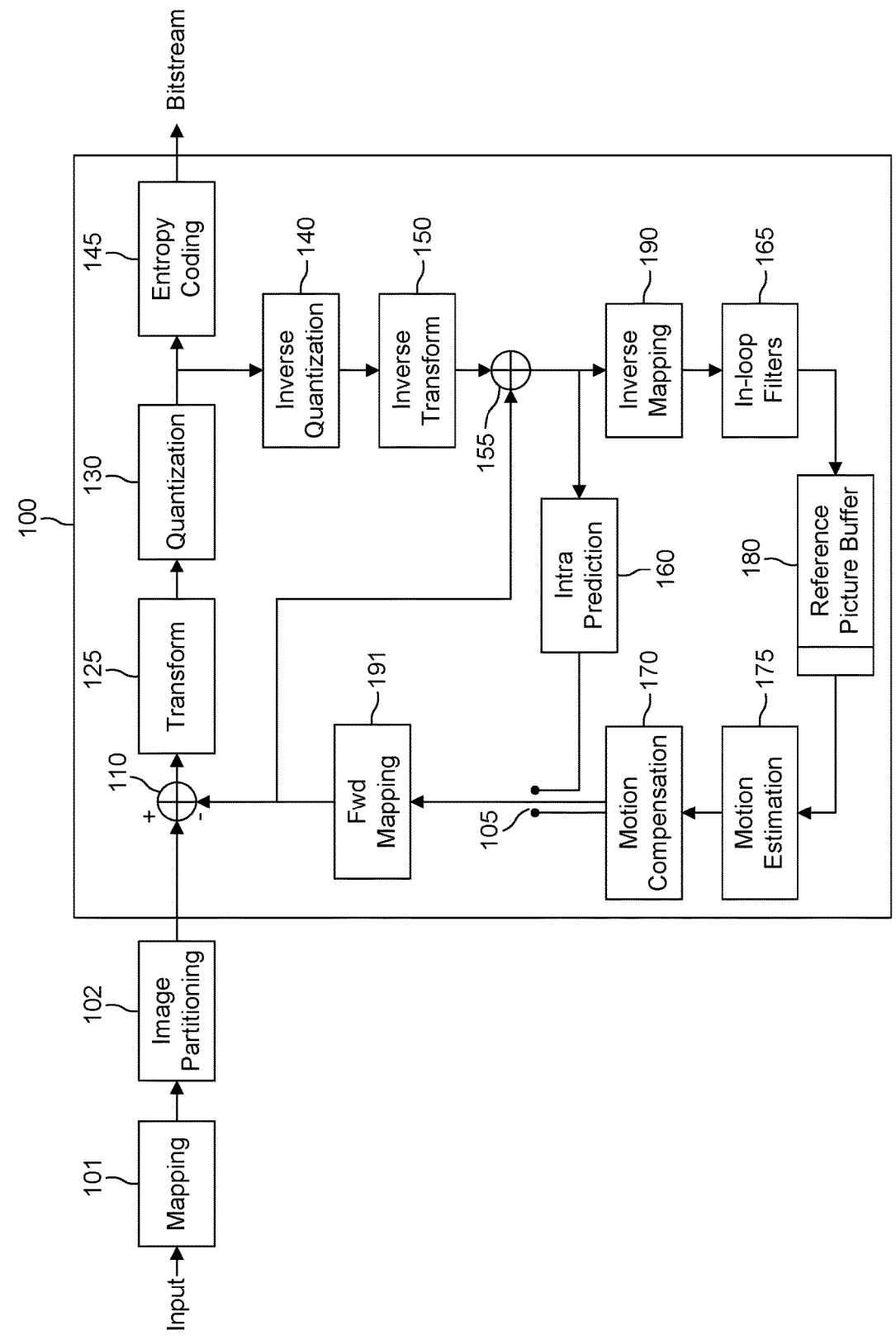
FIG. 13 shows a standard, generic video compression scheme.
Figure 14:
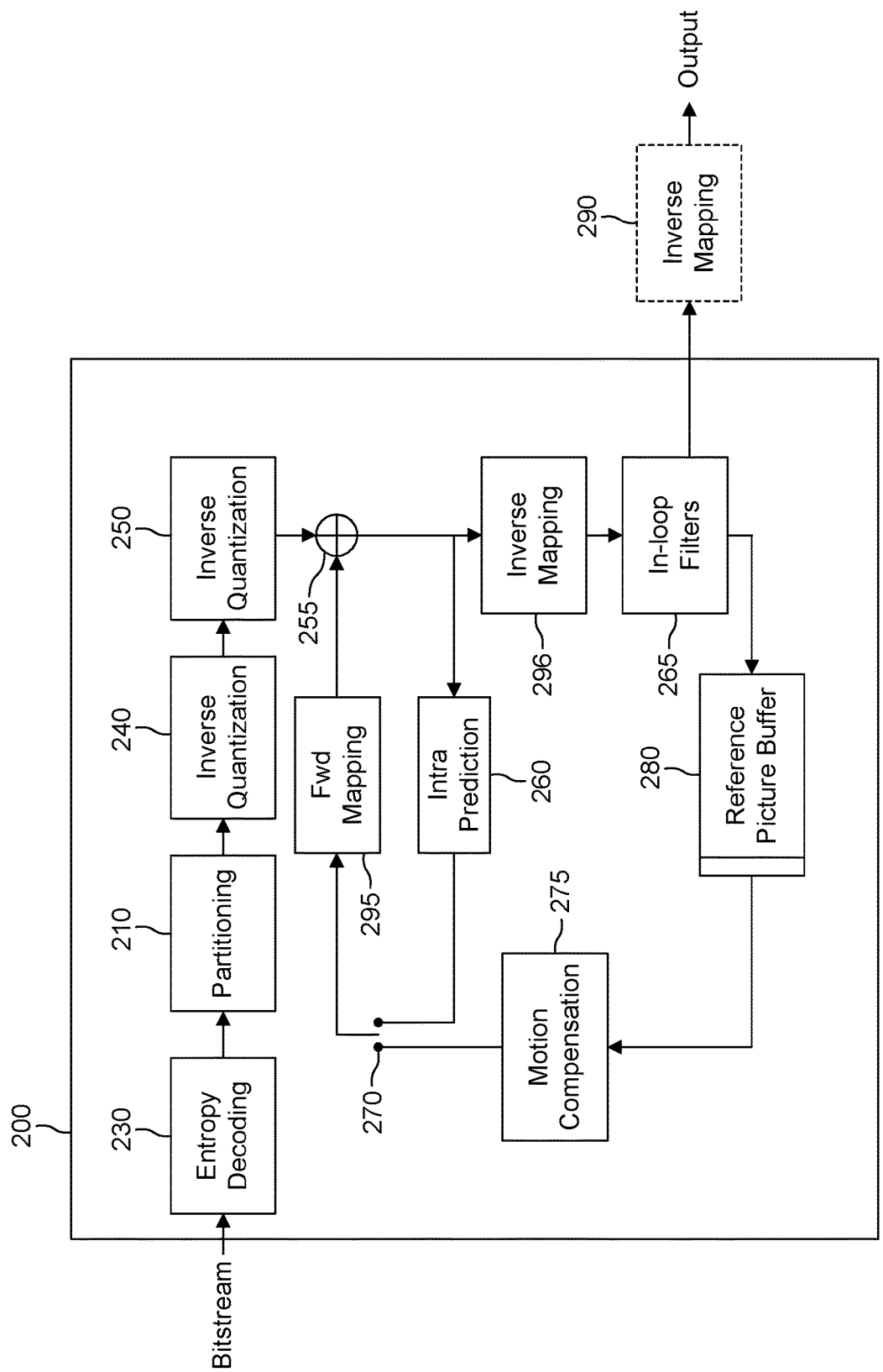
FIG. 14 shows a standard, generic video decompression scheme.
Figure 15:
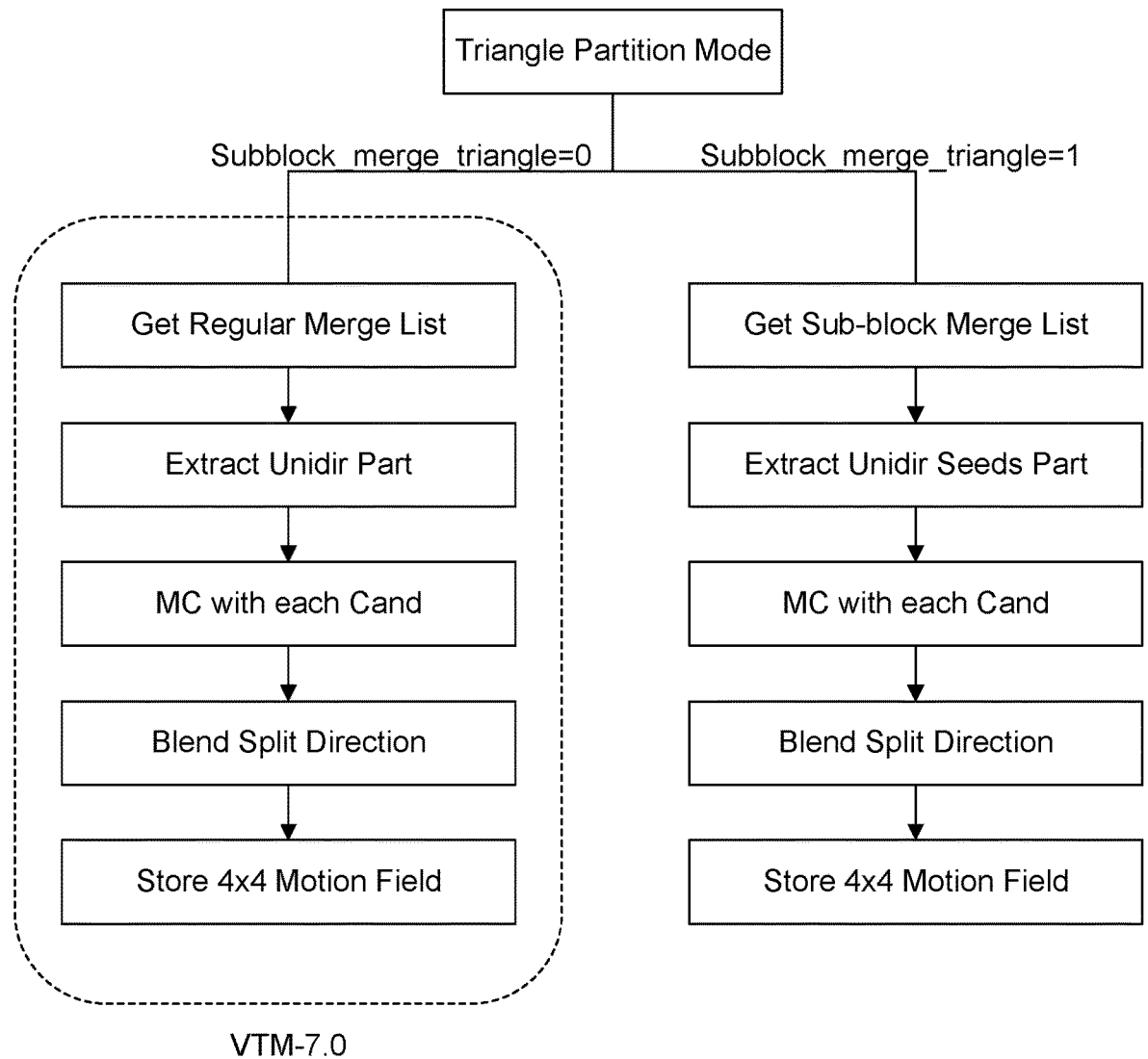
FIG. 15 shows an example flow diagram of a proposed sub-block triangle mode.
Figure 16:
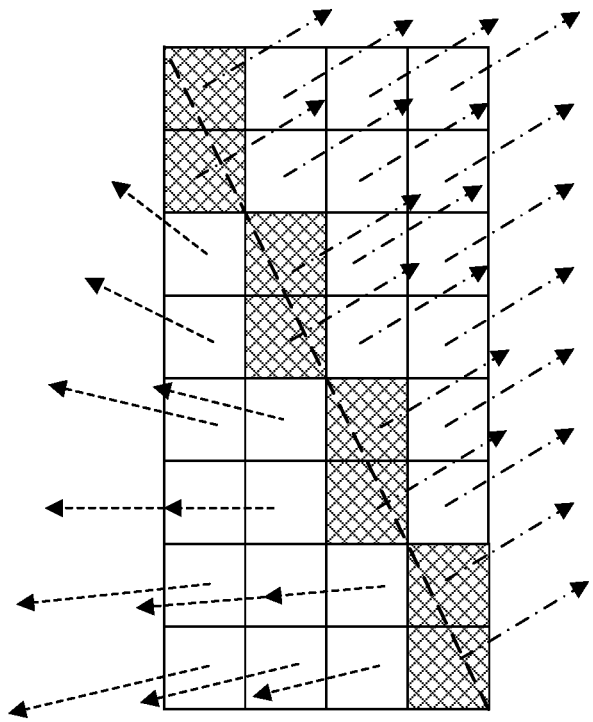
FIG. 16 shows an example of motion field storage with top sub-block partition and bottom regular one with a) bi-directional diagonal and b) regular/bottom unidirectional diagonal.
Figure 16:
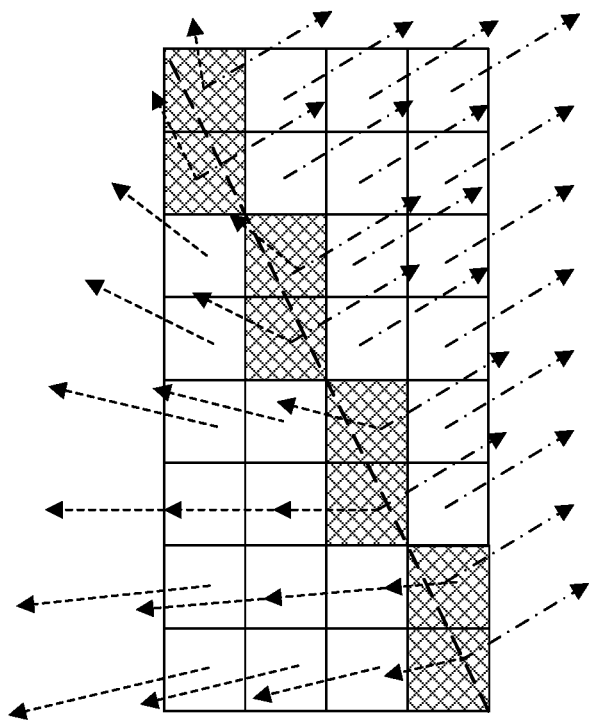
Figure 17:
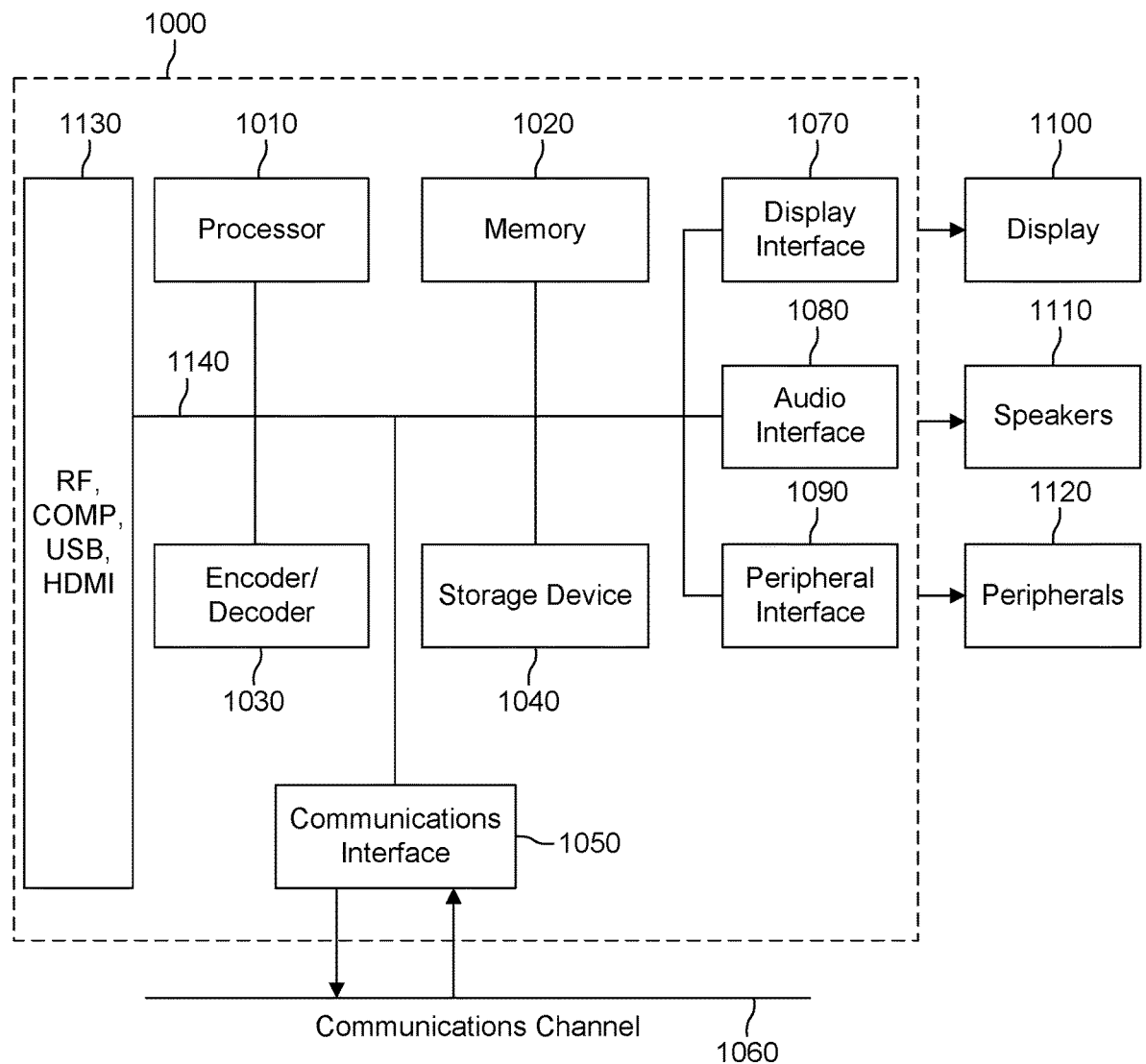
FIG. 17 shows a processor based system for encoding/decoding under the general described aspects.

The aspects described and contemplated in this application can be implemented in many different forms. FIGS. 13, 14, and 17 provide some embodiments, but other embodiments are contemplated and the discussion of FIGS. 13, 14, and 17 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 13 and FIG. 14. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 13 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 14 illustrates a block diagram of a video decoder 200. In the decoder 200, a bitstream is decoded by the decoder elements as described below. Video decoder 200 generally performs a decoding pass reciprocal to the encoding pass as described in FIG. 13. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 17 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 17, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium. Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun. As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to process jointly encode and decode digital video images using a combination of triangle partition mode and geometric merge mode.

A process or device to encode or decode digital video images using sub-block merge motion field in triangle and geometric coding mode.

A process or device comprising syntax or semantics that add a flag to signal if sub-block merge candidates are used instead of regular candidates to the aforementioned process or device.

A process or device comprising syntax or semantics that replace some regular merge candidates by sub-block merge ones in the aforementioned process or device.

A process or device comprising syntax or semantics that stores at least one motion field in the aforementioned process or device.

A process or device comprising syntax or semantics that considers all sub-block merge candidates or only sub-block temporal motion vector prediction or only affine ones in the aforementioned process or device.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine tools in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
obtaining unidirectional triangle candidates from a merge list for encoding a video block;
extracting portions of said unidirectional triangle candidates;
obtaining triangle merge candidates from a sub-block merge list of candidates, wherein the sub-block merge list in triangle partition mode is restricted based on dimensions of the video block;
extracting unidirectional seeds portion of said triangle merge candidates;
performing motion compensation on said video block using said portions of the unidirectional triangle candidates and said triangle merge candidates;
weighting the motion compensated video block;
signaling whether a sub-block or regular list of candidates was used for said motion compensated results; and
encoding the weighted motion compensated video block.

2. An apparatus, comprising:
a processor, configured to:
obtain unidirectional triangle candidates from a merge list for encoding a video block, wherein the merge list in triangle partition mode is restricted based on dimensions of the video block;
extract portions of said unidirectional triangle candidates;
obtain triangle merge candidates from a sub-block merge list of candidates;
extract unidirectional seeds portion of said triangle merge candidates;
perform motion compensation on said video block using said portions of the unidirectional triangle candidates and said triangle merge candidates;
weight the motion compensated video block;
signal whether a sub-block or regular list of candidates was used for said motion compensated results; and
encode the weighted motion compensated video block.

3. A method, comprising:
parsing a video bitstream to determine whether unidirectional triangle candidates are selected from a sub-block merge list or in a regular merge list;
obtaining unidirectional triangle candidates from either a sub-block merge list or a regular merge list for decoding a video block, wherein the sub-block merge list in triangle partition mode is restricted based on dimensions of the video block;
extracting portions of said unidirectional triangle candidates;
performing motion compensation on said video block using said portions of the unidirectional triangle candidates;
weighting the motion compensated video block; and
decoding the weighted motion compensated video block.

4. An apparatus, comprising:
a processor, configured to:
parse a video bitstream to determine whether unidirectional triangle candidates are selected from a sub-block merge list or in a regular merge list;
obtain unidirectional triangle candidates from either a sub-block merge list or a regular merge list for decoding a video block, wherein the sub-block merge list in triangle partition mode is restricted based on dimensions of the video block;
extract portions of said unidirectional triangle candidates;
perform motion compensation on said video block using said portions of the unidirectional triangle candidates;
weight the motion compensated video block; and
decode the weighted motion compensated video block.

5. The method of claim 1, wherein said candidates comprise a sub-block temporal motion vector predictor, an inherited candidate, and a constructed affine model candidate.

6. The method of claim 1, wherein usage of a sub-block merge list is restricted based on dimensions of a coding unit containing the video block, size of the coding unit, or coding unit area.

7. The apparatus of claim 2, wherein if affine model candidates are only considered during unidirectional triangle list construction, sub-block merge list usage is restricted to coding units having at least an affine neighboring coding unit.

8. The apparatus of claim 2, wherein a unidirectional triangle candidate is replaced by a sub-block candidate and one sub-block partition is combined with a regular partition.

9. The apparatus of claim 2, further comprising storing a 4×4 motion field.

10. The method of claim 1, wherein when candidates address a same reference picture list, 4×4 sub-blocks of a diagonal store a unidirectional motion field of a bottom candidate when both candidates are from a same merge list, and store regular unidirectional motion field when candidates are from different merge lists.

11. The apparatus of claim 2, further comprising storing affine control point motion vectors associated with a triangular partition when a candidate is from a sub-block merge list and is affine.

12. A device comprising:
   an apparatus according to claim 1; and
   at least one of (i) an antenna configured to receive a signal, the signal including the video block, (ii) a band limiter configured to limit the received signal to a band of frequencies that includes the video block, and (iii) a display configured to display an output representative of a video block.

13. A non-transitory computer readable medium containing data content generated according to the method of claim 1, for playback using a processor.

14. A non-transitory computer readable medium containing data content comprising instructions for performing the method of claim 3.

15. A computer program product comprising instructions which, when the program is executed by a computer, cause the computer to carry out the method of claim 1.

16. The method of claim 3, wherein said candidates comprise a sub-block temporal motion vector predictor, an inherited candidate, and a constructed affine model candidate.

17. The method of claim 3, wherein usage of a sub-block merge list is restricted based on dimensions of a coding unit containing the video block, size of the coding unit, or coding unit area.

18. The method of claim 3, wherein if affine model candidates are only considered during unidirectional triangle list construction, sub-block merge list usage is restricted to coding units having at least an affine neighboring coding unit.

19. The apparatus of claim 4, wherein a unidirectional triangle candidate is replaced by a sub-block candidate and one sub-block partition is combined with a regular partition.

20. The apparatus of claim 4, further comprising storing a 4×4 motion field.

* * * * *